Feb. 6, 1968    R. FORTUNE    3,367,625
SLIDE GATE VALVES
Filed June 22, 1965    4 Sheets-Sheet 1

INVENTOR
RONALD FORTUNE

INVENTOR
RONALD FORTUNE

Feb. 6, 1968 R. FORTUNE 3,367,625
SLIDE GATE VALVES
Filed June 22, 1965 4 Sheets-Sheet 3

INVENTOR
RONALD FORTUNE

United States Patent Office 3,367,625
Patented Feb. 6, 1968

3,367,625
SLIDE GATE VALVES
Ronald Fortune, 42 James St. N., Hamilton,
Ontario, Canada
Filed June 22, 1965, Ser. No. 465,920
12 Claims. (Cl. 251—172)

This invention relates to new and useful improvements in slide gate valves employing a flow-control gate which reciprocates in movement through a plane at right angular relation to the normal bore of the body of the valve. The slidable gate serves to regulate and to shut off the flow of fluid passed through the valve. More particularly, this invention pertains to a valve incorporating a novel seating and sealing device adjacent the opposite parallel faces of a slidable gate, the seating and sealing device being isolated from impingement by the flow of fluid passed through the valve, regardless of the degree of opening of the slidable gate between the fully opened and fully closed positions and vice versa.

The seating and sealing device comprises two annular pistons which are slidably contained within respective cylindrical recesses, located radially outward of and beyond the normal bore of the valve body and are remote from the path of the fluid flow. Moreover, the annular piston members are capable of being simultaneously actuated hydraulically, pneumatically or mechanically against both faces of the slidable gate, or, individually actuated against either side of the gate so as to regulate and control the degree of axial force required to effect a fluid-tight seal and to clutch the gate between the adjacent surfaces of the annular piston members or seating plates, and to maintain the gate in flexible self alignment.

In the prior art there are two main types of gate valves having a reciprocating gate for regulating the flow of fluid passed through the valve. The first type employs a taper-faced or wedge-shaped gate which, to completely shut off the flow, must be displaced to the fully closed position and be in solid contact with the adjacent angularly disposed seats in the bore of the body, to effect fluid-tight closure. In wedge gate valves of the prior art, the gate or disk may comprise two transversely disposed half segments having a spring action or an internal spreader between the two half segments to compensate for normal misalignment as the faces of the gate come in contact with the adjacent angularly disposed seat rings in the bore of the body. However, such construction does not prevent undue wear on the seats as the latter are exposed in the path of fluid flow. The second type employs a flat parallel-faced gate, the opposite faces of which, make sliding contact with the adjacent seats in the bore of the valve body throughout inward and outward movement between the fully opened and fully closed positions. In both of these prior valve constructions, the ring seats may form an integral mould with the body, or may be welded into the body prior to machine finishing, or may be detachably screwed into the bore of the body. In both types of valves, the final construction results in the ring seats forming an integral part of the body, the inner bore of the body and the bore of the ring seats being substantially identical. Thus, at any degree of opening of the valve, the seats are exposed directly in the path of fluid flow and are subject to erosion, corrosion and subsequent cavitation, preventing a drop-tight seal between the gate and the ring seats.

It is therefore one object of my invention to provide a slide gate valve having an independent annular seating and sealing device adjacent each side of the slidable gate located radially beyond the fluid passage or bore of the body, encircling the normal bore and being remote from the path of fluid flow, whereby to eliminate wear on the seats, which would otherwise be caused by impingement thereon of the fluid passed through the valve.

Another object of this invention is to provide a gate valve with pressure actuated means adjacent both faces of the gate for accurately positioning the gate in compensating self alignment and in which the gate is maintained in interfacial contact with the annular seating and sealing devices throughout the full movement of the gate from the fully opened to fully closed position and vice versa.

A further object of this invention is to provide a gate valve having a novel form of body characterized by two symmetrically opposed, transversely divided sections each of which has an annular housing, encircling the bore of the body, for slidably encasing an annular sealing and seating member which are controllable in axial displacement relative to the longitudinal bore of the body, which in construction and combination, produces an annular cylinder and piston device adjacent opposite sides of the gate and which is capable of being simultaneously or individually actuated hydraulically, pneumatically and mechanically for regulating the magnitude and direction of pressure required to move the sealing and seating members into planetary inter-facial contact adjacent opposite faces of the slidable control gate.

A still further object of the invention is to provide a construction whereby the annular sealing and seating members may be individually and separately produced in the form of premoulded rigid plastic or elastomer substances such as, nylon, Teflon, Penton, Saran, Neoprene and rubber or of precision machined rigid metallic materials to facilitate interchangeability and assembly of the valve.

A still further object of the invention is to provide a valve having a body with a narrow transversely disposed pocket depending beyond the lower extremity of the bore of the body and a flat surfaced, transversely disposed gate slidable therein, the gate having a flow-control opening substantially equal to the normal bore of the body and being wholly masked within the depending transverse pocket when in the fully closed position, whereby to prevent entry of fibrous or solid matter between the opposite faces of the flat gate and the closely fitting adjacent surfaces of the depending transverse pocket to ensure positive ejection of such matter from the opening in the gate as the latter is gradually opened.

A still further object of the invention is to provide a significant feature wherein the circular opening in the slidable gate cooperates with the circular bore of the body to produce a progressively graduated elliptical configuration capable of governing the capacity of fluid flow passed through the valve in substantially true linear flow characteristic, thus ensuring infinitely variable control between the fully opened and fully closed positions of the slidable gate and vice versa.

Other objects and advantages will become apparent from a study of the following detailed specification taken in conjunction with the accompanying drawings.

Figure 4:
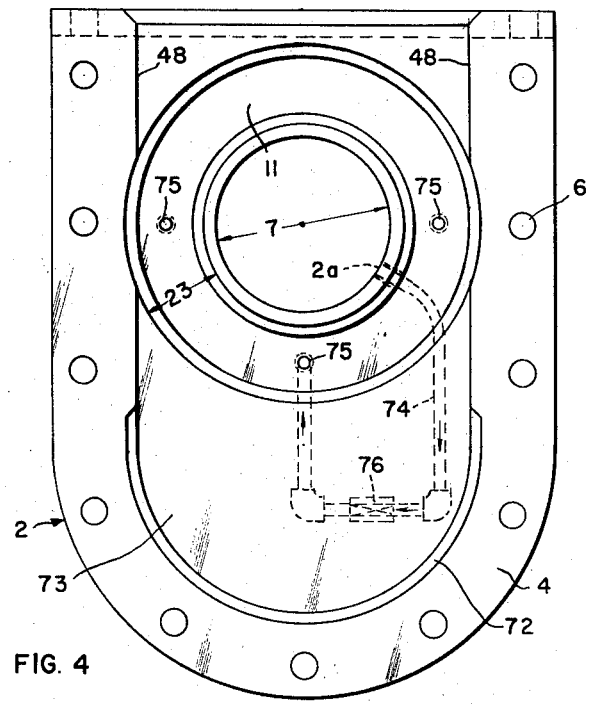

FIGURE 4 is a transverse elevation of the inside of one of the identical half segments of the body, illustrating the radially disposed housing for the actuating device, the encircling annular recess for containing the annular piston member and, concentric therewith, the counter-bored recess for retaining the annular wear plate or physical backing and support member. In broken lines, there is shown a diagrammatic outline indicating a simple means for bleeding fluid from the bore of the body directly into the encircling annular recess of the sealing device.

Figure 5:
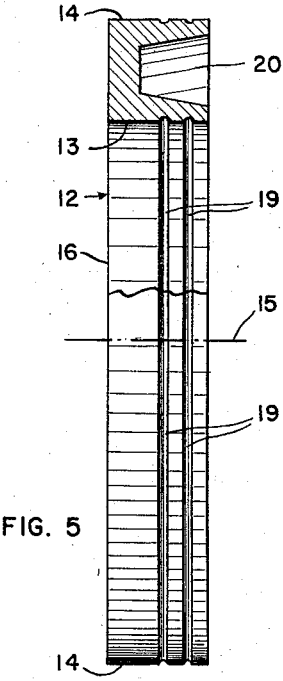

FIGURE 5 is a sectional view of a rigid annular piston member with capillary grooves around its circumference and bore.

Figure 3:
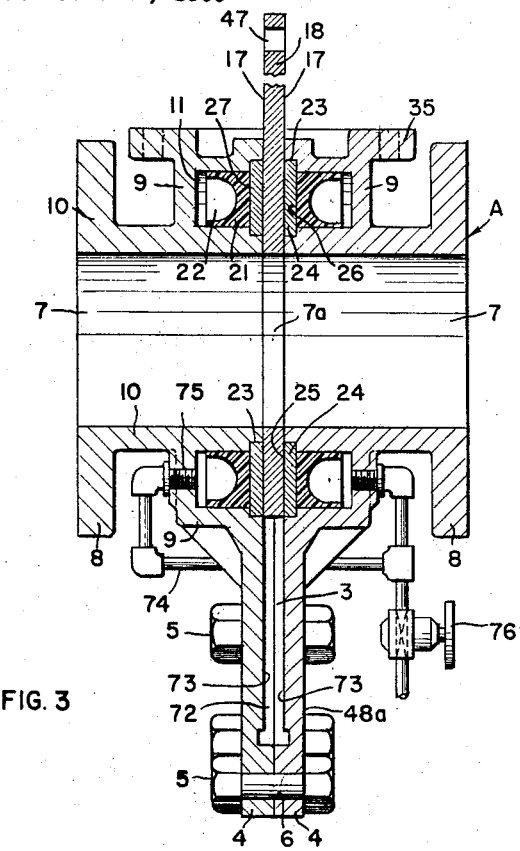
FIGURE 3 is a vertical section of the body and gate of the valve illustrating a modified construction of the annular sealing piston members, incorporating an annular seating and wear plate which also serves as a support and backing for distendable annular piston members of resilient elastomer or deformable plastic.
Figure 6:
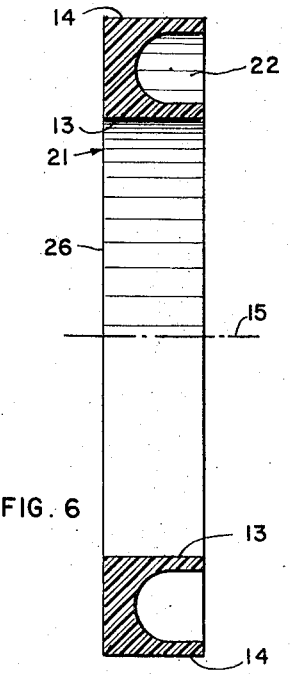

FIGURE 6 is a diametral cross sectional view illustrating another modified form of precision-moulded annular piston or seal member made from a resilient elastomer or deformable plastic substance, particularly adaptable to the construction shown in FIGURE 3.

Figure 7:
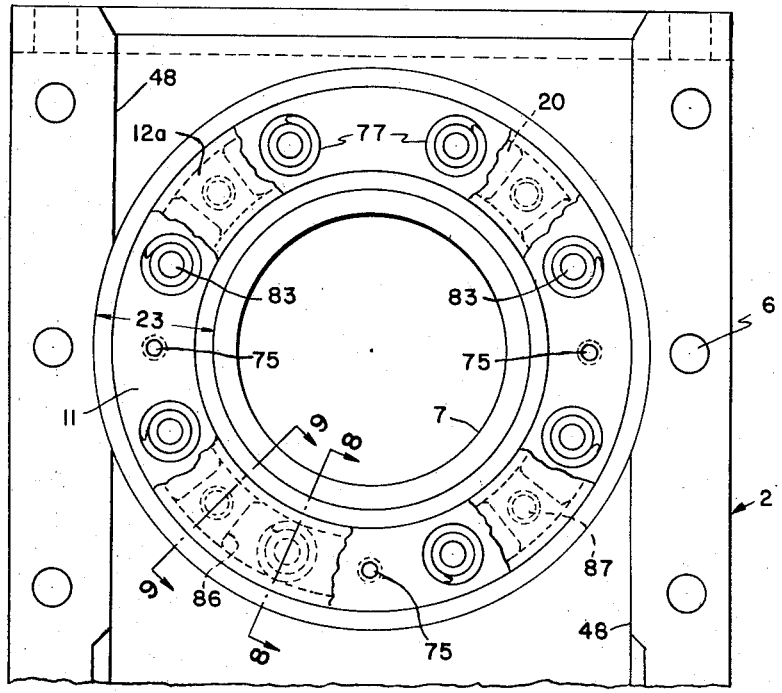

FIGURE 7 is a partial transverse elevation of the inside of one of the identical half segments of the body, illustrating a sub-assembly of a modified mechanically actuated sealing device incorporating a plurality of helical springs mounted within the annular cylinder recess.

Figure 8:
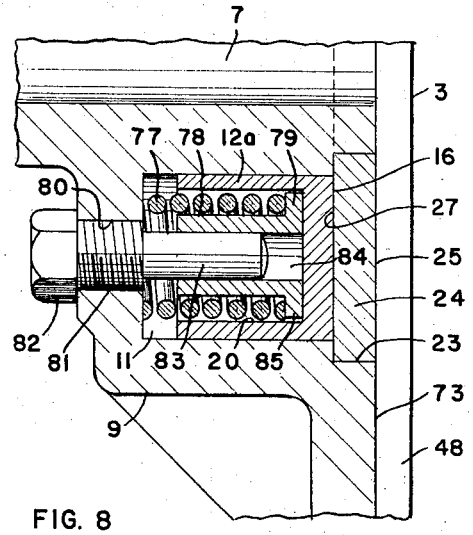

FIGURE 8 is a fragmentary section on the line 8—8 of FIGURE 7, illustrating in detail the method of assembling the recoilable helical springs within the encircling cylinder recess and the concentric cavity of the piston member.

Figure 9:
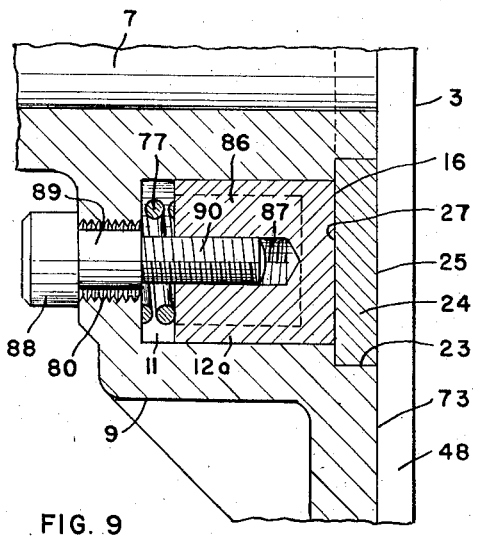

FIGURE 9 is a fragmentary section on the line 9—9 of FIGURE 7, illustrating in detail the construction for adjusting and restraining the plurality of helical compression springs from the outside of the radially disposed housing of the sealing device.

Figure 1:
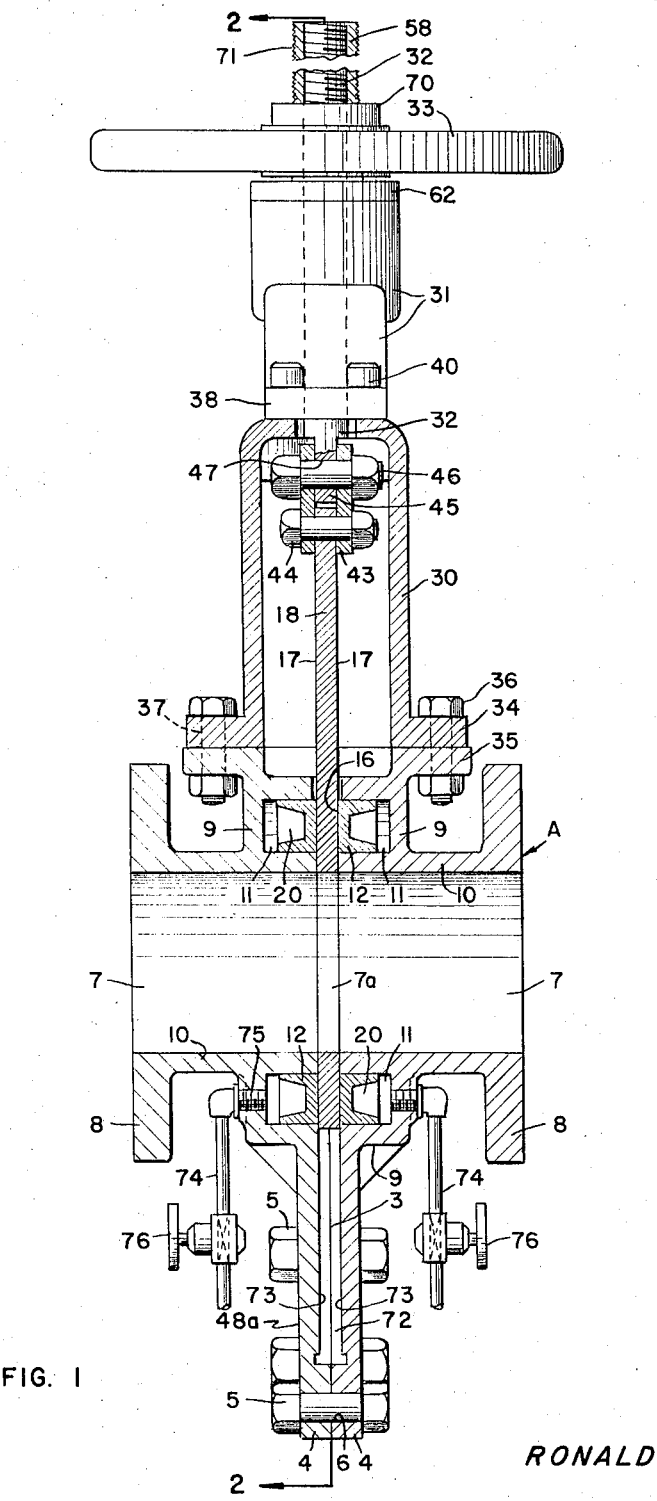
FIGURE 1 is a longitudinal section of an assembled valve in accordance with my invention, illustrating the gate in the fully open position showing one mode of attaching the stem thereto and also showing one modification of annular sealing and seating piston member in the form of a simple unitary component part.
Figure 2:
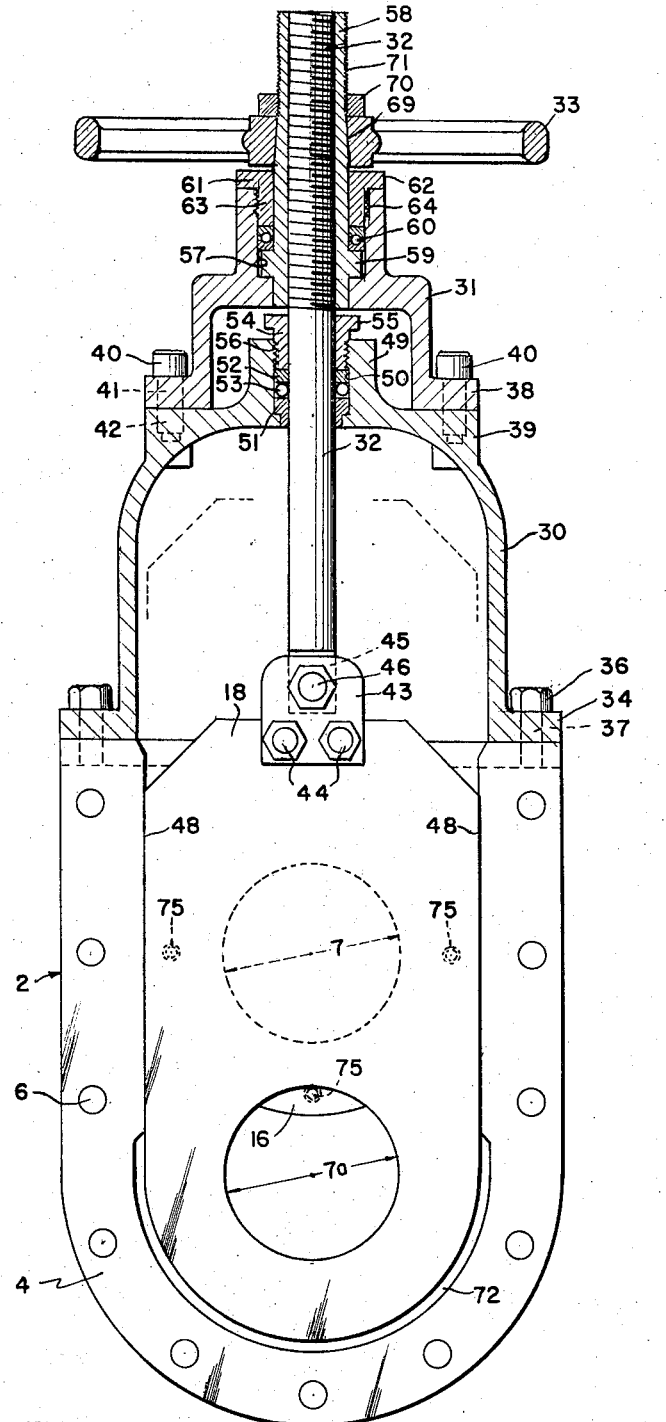
FIGURE 2 is a cross section taken on the line 2—2 of FIGURE 1 illustrating the gate in the lowermost fully closed position and showing the location of the flow control opening in the slidable gate within the depending pocket, and in chain circular line, the relative position of the bore in the body of the valve.

Referring to FIGURES 1 and 2, the valve body A preferably comprises two identical and interchangeable half sections 2 separated through the vertical transverse center line 3 and fastened together at the flanges 4 by bolts 5 which project through the holes 6. The body A has a straight through circular bore 7 provided with flanges 8 on each half section for suitable connection in a pipe line.

One important feature of my invention is that each half section 2 of the body A is formed with an integral housing 9 which extends radially outwards and beyond the bore 7 of the body and extends horizontally along the circular wall 10 of the body A to provide an annular chamber or cylinder 11 for receiving slidably therein the annular piston 12 which, in FIG. 1, illustrates a rigid metallic or suitable rigid non-metallic substance, such as nylon or Teflon, for service at elevated pressures and temperatures. This particular construction of rigid annular piston member 12 facilitates its being manufactured as a separate component amenable to precision machining thus ensuring interchangeable fitting tolerance within either of the annular cylinder recesses 11, the cylinders being machined to slidably receive the pistons.

Referring to FIGURE 5, the annular piston 12 has an inner bored surface 13 and an outer peripheral surface 14 in concentric axial alignment one with the other. At right angles to the axis 15 the surface of the seating and sealing face 16 is accurately ground or similarly finished to effect planetary close surface bearing contact adjacent the respective faces 17 of the slidable gate 18, as shown in FIG. 1. The outer peripheral surface 14 and inner bore 13 of the annular piston 12 preferably are provided with circular capillary grooves 19 capable of retaining a cushion of air, lubricant or hydraulic fluid when snugly assembled within the annular cylinder recess 11. The annular piston 12, adjacent its outer periphery, is provided with an annular cavity 20 which, when the piston is assembled into the annular cylinder 11, cooperates therewith to provide a reservoir for the air or fluid media required to actuate the piston 12 within the cylinder 11.

Referring to FIGURES 3 and 6, there is shown an alternative mode of construction for the actuating device. In this alternate assembly, the annular piston member 21 may be precision moulded from elastomer, plastic or other deformable material to fit accurately and interchangeably within the annular cylinder recess 11 and is capable of being pneumatically or hydraulically actuated throughout the annular cavity or reservoir 22. In this modified construction of the actuating device, each annular cylinder is provided with a counterbored recess 23 which peripherally retains yet permits rotational movement of the annular seating and backing plate 24 formed of suitable metal such as steel or bronze, or rigid reinforced plastic such as nylon and Teflon. Moreover, the rigid annular plate 24 provides a strong physical backing in combination with deformable or distendable materials used for the piston members 21 while the latter are subjected to pneumatic or hydraulic pressure, yet safely captive within the annular cylinder 11. Furthermore, the annular seating and backing plate 24 being capable of rotational movement within the counterbored recesses 23, minimizes scoring and cavitation between the surfaces 25 of the planetary faces of the plates 24 and the adjacent faces 17 of the slidable gate 18 whereby to ensure optimum service life when subjected to a wide variety of operating conditions. This alternative mode of construction of the actuating device retains all the advantageous features whereby the components comprising the modified non-metallic annular piston 21 in combination with the rigid annular backing plate 24 are capable of being separately produced as interchangeable precision components.

Reference to FIG. 4, illustrates in greater detail, the constructional elements for adapting the deformable annular piston member 21 and seating plate 24 within the annular cylinder 11. In this typical half section of the body A, shown in full elevation through the transverse central plane, the annular counterbored recess 23 adapted to receive the seating and backing plate 24, is more clearly revealed.

The modified configuration of the non-metallic deformable annular piston member 21 is shown in detail in FIG. 6.

Referring to FIG. 3, in the assembled location the surface 26, when the annular reservoir 22 is pressurized, abuts against the surface 27 of the seating and backing plate 24, to ensure and to maintain close surface contact adjacent each planetary seating plate 24 as the slidable gate 18 is clutched therebetween to effect a positive seal against possible escape of fluid passed through the valve.

Although not shown in the drawings, it should be evident for applications of the valve in high vacuum service and the like, the planetary faces 16 of the annular piston 12, and the surfaces 25 of the plates 24, may be produced with an annular "O" ring of elastomer or plastic substance incorporated therein, to act as a fluid seal, without departing from the spirit of the invention.

Generally, the valve comprises the elements and the construction herein before described and, for manually operated valves is equipped preferably as illustrated in FIGURES 1 and 2, with a closed bonnet 30, an extended yoke 31 for mounting the stem 32 and its operative mechanism including a handwheel 33. The bonnet 30 is fastened at the base flange 34 to the body-bonnet flange 35 by means of the bolts 36 which pass through the holes 37 and are threaded into the body flange 35. The extended yoke 31 for mounting the operating mechanism is fastened by its base flange 38 to bonnet mounting pads 39 by means of the capscrews 40 which pass through holes 41 in the flange and are threaded, as at 42, into the mounting pads 39.

Referring to FIG. 2, the stem 32 at its lower end, is fastened to the upper end of the gate 18 by the coupling plates 43 adjacent each face 17 of the gate. Two bolts 44 rigidly fasten the gate 18 between the coupling plates 43 while the lower end of the stem 32 is milled as at 45 to fit freely between the projections of the coupling plates. The coupling bolt 46 is a sliding fit in the hole 47 to permit transverse swivel movement of the gate 18 as it traverses between the fully open and fully closed positions so as to prevent binding of the gate between the guideways 48.

To withstand elevated temperature and pressure, volatile gas and destructive corrosive fluids the bonnet preferably is of totally enclosed construction having a stuffing box hub 49 projecting upwardly from the top center of the bonnet. The hub is bored, as at 50, to contain the lower formed packing ring 51, the upper formed packing ring 52 and the elastomer "O" ring 53 therebetween. Completing the stuffing box assembly is the gland 54 which has an integrally formed spanner nut 55, the gland 54 being threadedly engaged, as at 56 with the bore 50, for imparting compression adjustment on to the packing rings 51 and 52 and the "O" ring 53.

For mounting the stem 32 and its complementary operating components, the extended yoke 31 is axially counterbored, as at 57, to concentrically contain the sleeve nut 58 which has a thrust collar 59, a thrust bearing 60, a lock nut 61 which has a shoulder flange 62 and a threaded extension 63 which threadedly engages inside the bore 57, as at 64. The sleeve nut 58 preferably has a taper turned section as at 69 for mounting the handwheel 33 the latter being axially fastened into tapered fit around the turned section 69 by the ring nut 70 which threadedly engages the outer diameter of the sleeve nut 58, as at 71.

So far, this specification has been limited to an enclosed bonnet construction essential for certain operating conditions however, for applications of the valve at ambient temperature and low pressure, such as, for high density fibrous wood pulp solutions, it may be equipped with a bonnetless construction comprising a simple stuffing box mounted directly on the top body-bonnet mounting flange 35 and an outside stem and open yoke bracket, to amply satisfy the physical conditions of such ambient temperature and low pressure services without departing from the basic improvement of the invention which embodies the novel pressure-actuated sealing device for maintaining the inner fluid seal.

In operation, reciprocation of the stem 32 moves the gate 18 from fully open to fully closed position as revealed in FIGURES 1 and 2 respectively, and vice versa. When in the fully open position, the circular control opening 7a in the gate 18 assumes peripheral alignment with the bore 7 of the body A to provide a straight, smooth circular opening through the valve ensuring negligible resistance to the flow of fluid passed therethrough. Moreover, when in the fully opened position, the lowermost extremity of the gate 18 remains firmly clamped between planetary faces 16 of the annular seating and sealing devices, as in FIG. 1, to maintain a drop-tight seal and to prevent escape of fluid from the bore 7 of the body into the actuating devices.

Referring to FIGURES 1 and 2, it will be apparent that when the gate 18 is in the fully closed position it depends into the extended narrow, transversely disposed pocket 72 wherein it is slidably fitted between the inner faces 73 of the pocket 72 and the sealing surfaces 16 and 25 as shown respectively in FIGURES 1 and 3. Moreover, when the gate is in the fully closed position (FIG. 2) the circular flow-control orifice 7a is totally masked within the depending pocket 72 preventing collection of foreign matter which may be present in the fluid passed through the valve. Regardless of the degree of opening, accumulation of solid matter in suspension of the fluid is limited to the minimal volume defined by the diameter of the orifice 7a and the thickness of the slidable gate 18 which is sandwiched closely between the planetary surfaces of the actuated annular members and the inner faces 73 of the wall 48a of the transverse depending pocket 72.

Comparison between the fully open position FIG. 1 and the fully closed position FIG. 2 will clearly indicate that as the gate is gradually raised from the closed position, any foreign matter which may have been held captive within the opening 7a of the gate 18 is automatically ejected from the opening. Furthermore, as the gate opening 7a moves through the tranverse plane of the body, in either direction, it cooperates with the bore 7 of the body A producing an infinitely variable elliptical configuration to effect true linear flow-control characteristic through the variable elliptical configuration, providing for wide rangeability from extreme opened to extreme closed positions of the valve.

Actuation of the annular pistons 12 (FIG. 1) and 21 (FIG. 3) within the annular cylinders 11 is caused by admitting a supply of air, lubricant or hydraulic fluid fed through the tubular fittings 74 via the connecting passages 75 and into the annular cylinders 11 which are capable of being pressurized to any predetermined force required to move the annular piston members, relative to the opposed pressure within the valve proper, into contact with the opposite faces 17 of the gate 18 and to maintain opposing thrust forces adjacent each face 17 of the gate whereby to clamp the gate 18 therebetween in fluid-tight inter-facial contact. Referring to FIGURES 3 and 4, it will be observed that the housing 9 is provided with at least three supply passages 75, controlled by valves 76, to permit any desired combination of the tubular fittings 74 at either or both sides of the assembled valve for inlet and exhaust of air or hydraulic media employed to pressurize the cylinder-piston actuating devices. Depending on the direction of fluid flow through the valve and the resultant direction of thrust load on either side of the gate, the choice of inlet and exhaust connections for controlling the media to and from the actuating devices, provides for a differential of actuating force between each side of the gate, and the media feed-valves 76 may be either manual or remote controlled to regulate both actuators simultaneously or each actuator separately.

Reference to FIGURE 7, illustrates a partial transverse elevation of the inside of one of the identical half segments 2 of the body A incorporating a plurality of helical compression springs 77 radially spaced, in equiangular relation, within the cavity 20 of the annular piston member 12a which is slidably receivable within the encircling cylinder recess 11 of this modified construction for a mechanically actuated sealing device.

Reference to FIGURE 8, illustrates in greater detail, this modified construction using recoilable compression springs 77 which provide the residual energy for the mechanically actuated sealing device. The modified annular piston member 12a is snugly fitted within the annular cylinder or recess 11 and the annular cavity 20 in the piston member 12a is cored to accommodate any desired number of springs 77 whereby to transmit mechanical thrust against the annular member 12a and the annular plate member 24, in the direction of the gate 18.

To facilitate accurate assembly and dismantling of the parts in this mechanical actuating device, the outer wall of each housing 9 is provided with a number of tapped holes 80 in which the threaded shoulder 81 of the locating screw 82 is threadedly receivable. Each spring 77 is freely mountable around the outer diameter 78 of each bearing sleeve 79 while the outer diameter of the spring 77 has sufficient clearance within the cavity 20 of the annular piston member 12a so that it is free to compress and recoil. Each locating screw 82 is provided with a projecting plain dowel shank 83 which is slidably receivable in the drilled hole 84 through the axis of the bearing sleeve 79, providing a locating pivot for each sleeve 79 which, in turn, accurately positions each spring 77 within the annular cavity 20 of the piston member 12a. At its outer end, each sleeve 79 is provided with a circular collar 85 against which the inner end of each spring 77 abuts.

Reference to FIGURE 9, taken in conjunction with FIGURE 7, illustrates in detail the preferred construction for the mechanically actuated sealing device wherein the modified annular piston member 12a has a number of integral fastening pads 86 located within the annular cavity 20. The fastening pads are disposed radially intermediate the springs 77 and each pad 86 has a tapped hole 87. The tension-adjusting screw 88 has an enlarged plain diameter shoulder 89 which is rotatable within the minor thread diameter of the tapped hole 80. The projecting shank 90, of smaller diameter, is threaded to engage the tapped hole 87. Rotation of the screws 88 in a clockwise direction draws the annular piston member 12a and the collared bearing sleeves 79 (FIG. 8) in the direction away from the annular plate member 24 and the gate 18, compressing and restraining the springs 77, whereby the thrust against the annular member 24 and the gate 18 is rendered ineffective and the gate may then be withdrawn from between the annular sealing devices and may also be slid into the body to the full depth of the depending pocket 72, while the two half segments 2 of the body A remain bolted together. Moreover, when the gate has been withdrawn out of the body, either annular plate member 24 may be withdrawn or replaced merely by positioning the body on either end, whereby the annular plate 24 may be moved freely into the space between the two surfaces 73 of the transversely disposed, depending pocket 72. It should be apparent that after the gate 18 and annular members 24 have been replaced, the tension screws 88 are removed and threaded plugs substituted therefor, in the tapped holes 80.

The modified construction of the spring-loaded mechanically-actuated sealing device is designed mainly for application in certain operating conditions wherein a dry seal is desirable or essential to obviate possible contamination of the fluid passed through the valve. For such applications, the annular plate member 24 preferably is made of a self-lubricating non-absorbent plastic substance, such as, trifluorochloroethylene or polytetrafluoroethylene.

It should be apparent that any one of the three modified constructions of the pressure-actuated sealing devices may be charged to any desired static pressure by injecting lubricant from a high pressure lubricating gun, through a non-return hydraulic fitting which may be located in any one of the supply passages 75 in the encircling housing 9, to fill the annular cavity.

In construction and combination, I have provided a fluid-tight non-clogging valve capable of handling a broad range of commercial fluids such as, water, oil, gas, chemical solutions, fibrous pulp and paper stocks. In addition, the unique construction is practically adaptable for conveyance of wood chips and bark in solution, as the circular opening in the slidable gate cooperates with the closely fitting transverse pocket to provide an internal shear or chip breaker for shredding such solids that may otherwise prevent partial or complete closure of the gate, and to positively eject solids from within the pocket as the gate is opened. All of which contributes towards a valve capable of rendering improved operation and reliability in service.

The embodiments of the invention in which an exclusive property or privilege is claimed are defined as follows:

1. A gate valve comprising two matching body sections with a passageway therethrough, means for holding the two sections assembled in matching relationship to form a body, an annular recess in each section encircling said passageway, an annular member snugly but movably mounted in each recess, a gate, adapted to be moved from open to closed position and vice versa, mounted between said sections with the opposite faces of said gate in contact with said annular members, an opening in said gate adapted to be brought into varying degrees of alignment with said passageway as the gate moves between fully open and fully closed position, means for moving said gate from open to closed position and vice versa, and means for exerting pressure against said annular members in the direction of said gate in order to form a fluid-tight seal between said members and said gate, said body being formed with a pocket for snugly receiving said gate during movement from open to closed position.

2. A gate valve in accordance with claim 1 in which the pocket is mounted on said body directly opposite to the means for moving the gate.

3. A gate valve in accordance with claim 1 in which said annular members are machined rigid members adapted to abut tightly against the respective faces of said gate.

4. A gate valve in accordance with claim 1 in which said annular members are made of plastic of sufficient thickness to be rigid.

5. A gate valve in accordance with claim 1 including means for exerting fluid pressure against said annular members.

6. A gate valve in accordance with claim 1 including means for independently exerting pressure against each of said annular members.

7. A gate valve in accordance with claim 1 in which said annular members are rigid with the face adjacent the gate machined to abut tightly against the gate, and which includes means for exerting fluid pressure against said members, and a deformable member mounted snugly in each recess between said fluid pressure means and said annular member.

8. A gate valve in accordance with claim 7 in which said deformable members are formed with a cavity on the side of the fluid pressure.

9. A gate valve in accordance with claim 1 in which the annular members are rigid with the face adjacent the gate machined to abut tightly against the gate, and which includes means for exerting pressure against said members, and an intermediate rigid member with a cavity in its outer periphery, snugly but movably mounted in each encircling recess between said pressure means and said annular member.

10. A gate valve in accordance with claim 9 in which the means for exerting pressure comprises a plurality of helical compression springs positioned radially within and interposed between said recess and said cavity, said springs being freely mounted on bearing sleeves within said cavity, said sleeves being axially slidable on supporting dowels which are detachably fastened to the housing about the encircling recess, the assemblage of slidable sleeves cooperating with the recoilable springs to exert pressure on the intermediate rigid member in the direction of said annular member and said gate.

11. A gate valve in accordance with claim 1 in which said pocket is formed with guide-ways on either side of the opposite edge portions only of said gate.

12. A gate valve in accordance with claim 11 in which said means for moving said gate from open to closed position and vice versa is a stem having a swivel attachment to said gate.

References Cited

UNITED STATES PATENTS

| | | | |
|---|---|---|---|
| 783,953 | 2/1905 | Henry | 251—172 |
| 1,476,344 | 12/1923 | McGee | 251—172 X |
| 1,607,827 | 11/1926 | Herrmann | 251—174 |
| 2,726,842 | 12/1955 | Seamark | 251—172 |
| 3,044,741 | 7/1962 | Grove | 251—174 X |
| 3,134,396 | 5/1964 | Bredtshneider | 251—174 X |

FOREIGN PATENTS

| | | |
|---|---|---|
| 324,654 | 8/1920 | Germany. |
| 770,775 | 3/1957 | Great Britain. |
| 1,000,411 | 4/1965 | Great Britain. |

CLARENCE R. GORDON, *Primary Examiner.*